Oct. 28, 1924.

A. F. MACKAY

TOOTHED GEARING

Filed March 8, 1924

INVENTOR
*Alexander Fraser Mackay*
BY HIS ATTORNEYS
*Howson and Howson*

Patented Oct. 28, 1924.

1,513,621

UNITED STATES PATENT OFFICE.

ALEXANDER FRASER MACKAY, OF GLASGOW, SCOTLAND.

TOOTHED GEARING.

Application filed March 8, 1924. Serial No. 697,766.

*To all whom it may concern:*

Be it known that I, ALEXANDER FRASER MACKAY, a British subject, and a resident of Glasgow, Scotland, have invented certain new and useful Toothed Gearing, of which the following is the specification.

The invention has for its object a novel form of toothed gearing applicable in a wheel external or internal or as a rack, and which may be engaged by wheels or racks having teeth of usual or solid form. The improved form of gearing is simple in construction and inexpensive in manufacture and is particularly applicable in cases in which the tooth forms, with which it engages, are irregular or roughly made.

Toothed gearing made according to the invention comprises a series of tooth elements which may be of standard or accepted tooth form in cross-sectional contour or which may be circular, oval, ovoid, prismatic, or of other similar form in cross-sectional contour.

Each tooth element consists of a number of rods or wires of circular, oval or like section lying parallel with one another in a body, and arranged across the wheel or rack—that is to say, in the case of a wheel, with the general axis of each bundle of rods parallel with the wheel axis (although the individual rods in the bundle may be helically twisted so that the whole assumes a rope-like form). The bundles of rods are loosely located in pitched apertures of the tooth-like, circular or other contours hereinbefore set forth in discs or the like (in the case of a rack, in bars or plates) and are prevented from endwise movement by end-plates or equivalent devices. The amount of looseness or freedom which is permitted the rods or wires—their numbers being less than to entirely fill the apertures—is such that they displace one another and yield to the entering teeth with which they mesh, thus offering a considerable amount of resilient yield and accommodation.

In some cases resilient, flexible, or deformable core elements may be inserted centrally in the bundles of rod or wire and be located by any convenient means.

Figure 1:
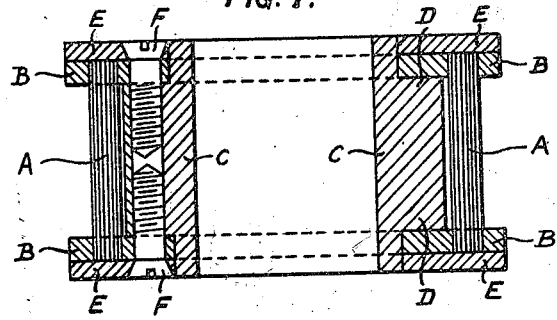
Figure 2:
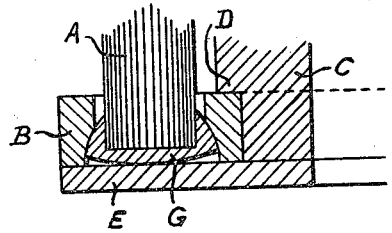
Figure 3:
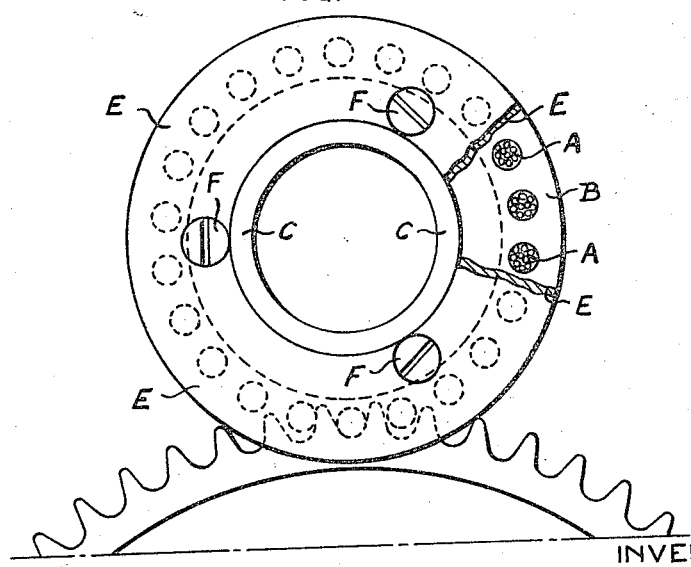

Two illustrative examples of the invention are shown on an accompanying sheet of explanatory drawings in which Figure 1 is a sectional elevation of a wheel made according to the first example, Figure 2 a sectional elevation of the second example, and Figure 3 a plan view of the wheel shown in Figure 1, with part of the flange removed in gear with a wheel having solid teeth.

According to the first example, each tooth element consists of a loose bundle of rods or wires A of like section and the ends of these bundles are inserted in pitched apertures in flange-rings B which are mounted on either end of the wheel boss C against shoulders D thereon. End-plates E, secured to the wheel boss by means of screwed pins F bear upon the outer faces of the flange-rings B which hold the teeth elements thereby holding these flange-rings in place and preventing endwise movement of the rods forming the teeth elements.

The example shown in Figure 2 only differs from the previous one in that the ends of the rods forming the teeth elements are inserted in socket pieces G which are themselves inserted in the pitched apertures in the flange-rings B. The external surface of the socket-pieces and the internal surface of the apertures are of spherical form so as to facilitate, if desired, the setting of the teeth elements at an inclination to the axis of the wheel shaft either to form a bevel wheel or to form an approximation to a wormwheel and also to allow them freedom to bend.

What I claim is:—

1. In toothed gearing, a series of tooth elements each consisting of a loose bundle of rods, in combination with a framework having a series of pitched apertures or recesses loosely engaging the ends of the rod bundles and retaining them, the apertures being pitched after the manner of teeth as and for the purposes described.

2. In a toothed gear wheel a series of tooth elements each consisting of a loose bundle of rods, in combination with a flanged boss forming a wheel center and having a series of pitched apertures or recesses in the flanges retaining the tooth elements, and end plates secured to the wheel boss bearing upon the outer faces of the flanges and adapted to prevent endwise movement of the tooth elements.

3. In toothed gearing, a series of tooth elements each consisting of a loose bundle of rods, in combination with a framework having a series of pitched apertures or recesses each having an internal spherical surface, in combination with socket pieces therein and coacting therewith, having an external spherical surface, and adapted to receive the ends of the tooth elements.

In testimony whereof I have signed my name to this specification.

ALEXANDER FRASER MACKAY.